United States Patent [19]

Gicewicz

[11] Patent Number: 4,986,119
[45] Date of Patent: Jan. 22, 1991

[54] VEHICLE DIAGNOSTIC DEVICE

[76] Inventor: Gerald P. Gicewicz, 2049 Collett La., Flossmoor, Ill. 60422

[21] Appl. No.: 444,887

[22] Filed: Dec. 4, 1989

Related U.S. Application Data

[63] Continuation-in-part of Ser. No. 191,269, May 6, 1988, Pat. No. 4,912,970.

[51] Int. Cl.$^5$ .......................................... G01M 17/02
[52] U.S. Cl. ...................................................... 73/146
[58] Field of Search ................ 73/146, 117, 8, 9, 122, 73/124, 128; 33/203.13

[56] References Cited

U.S. PATENT DOCUMENTS

| | | | |
|---|---|---|---|
| 2,137,949 | 11/1938 | Phelps | 33/203 |
| 2,777,211 | 1/1957 | Martin | 33/203.13 |
| 3,187,440 | 6/1965 | Merrill et al. | 33/203.13 |
| 3,411,346 | 11/1968 | Gagliardi | 73/117 |
| 3,546,782 | 12/1970 | Pereue et al. | 33/203.13 |
| 3,587,325 | 6/1971 | Hunter et al. | 73/462 |
| 3,589,182 | 6/1971 | Burgett | 73/146 |
| 3,621,247 | 11/1971 | Lide | 250/52 |
| 3,643,337 | 2/1972 | Dick | 33/203.13 |
| 3,729,992 | 5/1973 | Lichtman et al. | 73/146 |
| 3,812,592 | 5/1974 | Haupt | 33/203.13 |
| 3,815,407 | 6/1974 | Lavery | 73/67.2 |
| 3,908,280 | 9/1975 | Murakami et al. | 33/203.13 |
| 4,169,373 | 10/1979 | Clark et al. | 73/146 |
| 4,912,970 | 3/1990 | Gicewicz | 73/146 |

Primary Examiner—Donald O. Woodiel
Attorney, Agent, or Firm—Leydig, Voit & Mayer

[57] ABSTRACT

A diagnostic testing device for diagnosing and testing chassis, mechanical, tire and tire tread problems in vehicles which simulates normal operating angles and normal vehicle weight conditions with the wheels of the vehicle being cycled and steered at a full range of vehicle speeds. The diagnostic testing device includes a support having a horizontal upper surface, a platform movably coupled to the upper surface of the support so as to allow the platform to glide horizontally in any direction, and a pair of support rollers rotatably connected to the platform so as to provide rolling surfaces to contact the tire tread and which allow a tire to cycle and be steered when placed upon said rollers.

39 Claims, 6 Drawing Sheets

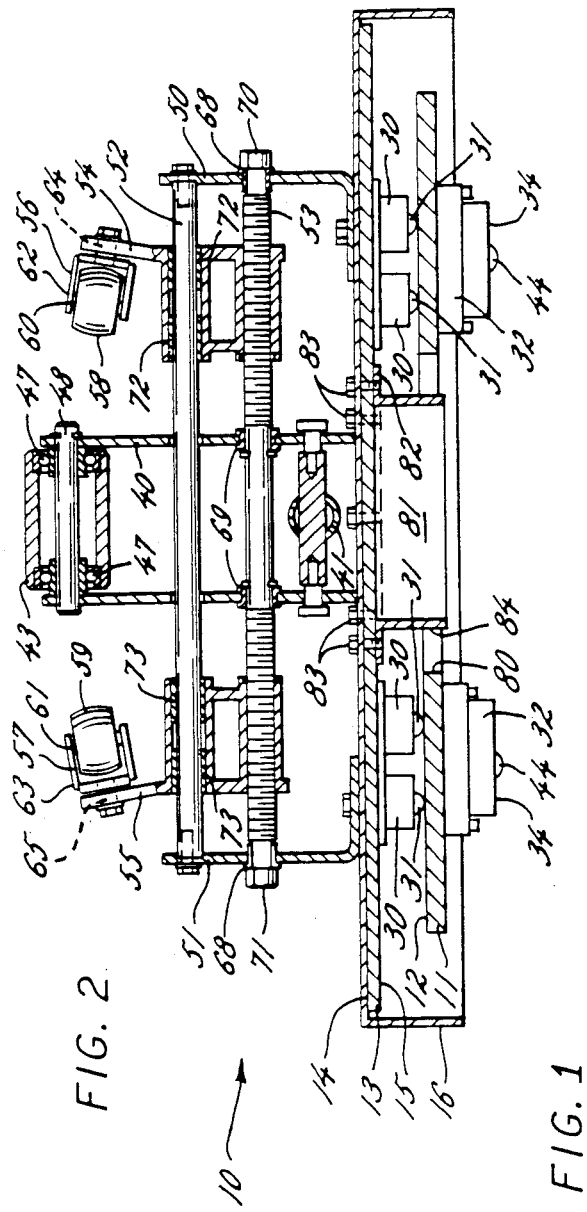
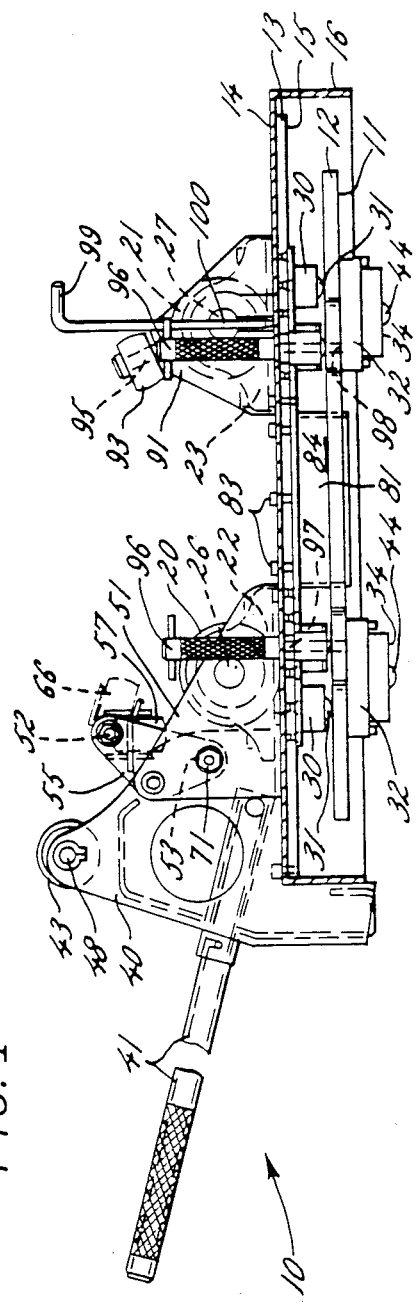
FIG. 2
FIG. 1

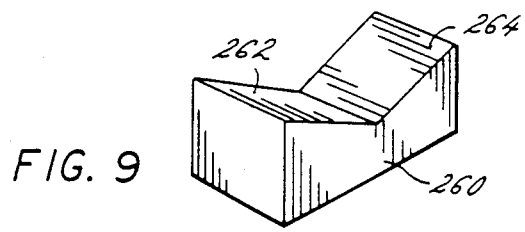
FIG. 9
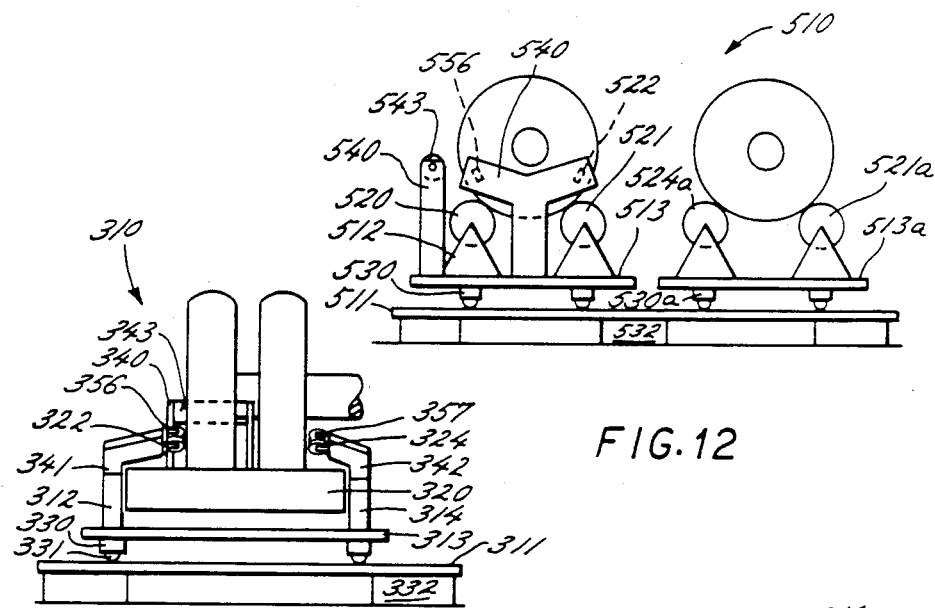
FIG. 12
FIG. 10
FIG. 11
FIG. 13

VEHICLE DIAGNOSTIC DEVICE

BACKGROUND

This application is a continuation-in-part of copending application Ser. No. 07/191,269, filed May 6, 1988, now U.S. Pat. No. 4,912,970.

This invention relates generally to the testing of vehicles for mechanical defects and tire problems that affect the safety and ride quality of vehicles and more particularly concerns a product useful for testing tires and chassis related problems while the tires are under the full weight of the vehicle and being driven and steered. One of the most troublesome problems in testing vehicles is simulating actual driving conditions similar to those when the problem appears. Of course, road testing of vehicles can be done but it involves risk of accidents and adverse weather, and road noise makes many problems unnoticeable. Also one cannot view the chassis components but has to observe from the passenger compartment.

Testing vehicles inside of a building has been done. For example, some have used dynamometers and chassis dynamometers, but such devices do not allow the tires to be steered since they have fixed parallel rollers each of which contact both tires of a single axle of a vehicle. Additionally, when using a dynamometer or chassis dynamometer, both wheels on an axle are driven at the same time, so that one wheel cannot be independently driven. Also since a vehicle is restricted in its position during use to avoid having the vehicle travel off the rollers of the dynamometer, the tires exert forces against the rollers.

Some devices have been used to inspect or test tires while not on a vehicle, such as those shown in U.S. Pat. Nos. 3,589,182 to Brugett, 3,621,247 to Lide, 3,729,992 to Lichtman, and 4,169,373 to Clark, et al. However, these devices do not have the capability to test the tires on a vehicle or under normal operating conditions.

Other devices are used to align wheels but cannot be used when the wheels are steered, such as those shown in U.S. Pat. Nos. 2,777,211 to Martin, 3,587,325 to Hunter, 3,812,592 to Haupt, 3,815,407 to Lavery, and 3,908,280 to Murakami, et al.

Still other devices are used to align wheels and adjust the caster, but only have limited ability to steer and cannot be operated at high rates of speed such as sixty (60) to eighty (80) miles per hour, see for example, U.S. Pat. Nos. 2,137,949 to Phelps, 3,187,440 to Merrill, and 3,546,782 to Pereue, et al.

When a vehicle is viewed being driven down a street it will be noticed that each vehicle moves differently (bounce, sway, etc.) depending on the manufactured stiffness of the vehicle's chassis components. This is partly a result of the suspension stiffness and interaction of all suspension components of a vehicle. A sportscar is designed to quickly transmit road variations to the driver so that the driver can react quickly, while a town car is designed to absorb road deviations so that they will not be felt by the passengers. When the weight of a vehicle is removed from its wheels, the wheels will hang down at different angles and stresses as compared to the way they are positioned with the full weight of the vehicle on them. This abnormal angle of the wheels and suspension system of the vehicle changes the relationship of each connecting part and creates forces, sensations and noises which are different than when normal. The normal operating angle of a vehicle is defined as the relationship in degrees or stress that exists between each component in a suspension system of a vehicle while the tires of a vehicle are supporting the weight of the vehicle and are allowed to cycle. Thus, it would be desirable to develop a diagnostic device which would, in a safe controlled environment, duplicate a vehicle's own problem systems under the vehicle's own normal operating angles in order to greatly enhance the diagnosis of mechanical defects that otherwise could not be seen, felt or heard.

Accordingly, it is an object of the invention to provide a diagnostic device which will allow for testing of a vehicle in an operational mode which will simulate actual driving conditions. It is a related object to provide a diagnostic device that permits testing when the tire is cycled in either the forward or reverse direction.

It is an object to provide a diagnostic device that will test the chassis, wheel, suspension, tire and tire treads of a vehicle under normal operating angles.

It is a further object to provide a diagnostic device that will perform tests at sound levels low enough to allow the user to hear the location of the problems.

It is a further object to provide a diagnostic device that will perform tests while the tire is cycling and the vehicle is being steered.

It is a further object to provide a diagnostic device that will allow testing of a vehicle with its wheels being cycled without exerting outside forces on the vehicle, such as those exerted when the vehicle is chained to the device.

It is a further object to provide a diagnostic device that is user friendly and has safety backups which inhibit a vehicle from leaving the testing device. A related object is to provide a device which is easily adjusted to facilitate the performance of different tests and the testing of tires having a range of widths. Another object is to provide a device that may be used to facilitate testing of a wide range of vehicles.

It is a further object to provide a diagnostic device that will absorb most of the forces of a cycling or a cycling steered wheel thereby allowing the vehicle's chassis to remain in one position, which represents a normal operating angle.

It is a further object to provide a diagnostic device that will absorb all forces of a cycling or a cycling steered wheel thereby allowing the vehicle's chassis to remain motionless, which represents a modified normal operating angle wherein a partially unweighed situation is simulated such as when a vehicle bounces on a road.

It is an additional object to provide a diagnostic device which prevents damage to the tires when cycling in either the forward or reverse directions.

SUMMARY OF THE INVENTION

In accordance with the invention, a diagnostic device useful for diagnosing and testing chassis, mechanical, tire and tire tread problems in vehicles includes a support having a horizontal upper surface, a platform movably coupled to the upper surface of the support so as to allow the platform to glide horizontally in any direction, and a pair of support rollers rotatably connected to the platform so as to provide rolling surfaces to contact the tire tread and which allow a tire to cycle when placed upon said rollers.

BRIEF DESCRIPTION OF THE DRAWINGS

Other objects and advantages of the invention will become apparent upon reading the following detailed description and upon reference to the drawings, in which:

FIG. 1 is a side view of a device constructed in accordance with the instant invention showing a partial cut away view along sight line 1—1 of FIG. 3;

FIG. 2 is a sectional view of the device of FIG. 1 taken generally along sight line 2A—2A and sight line 2B—2B of FIG. 3;

FIG. 9 is a perspective view of a height matching block which may be used in accordance with the instant invention;

FIG. 10 is a schematic rear view of an alternate embodiment of the invention;

FIG. 11 is a schematic rear view of an alternate embodiment the invention;

FIG. 12 is a schematic rear view of an alternate embodiment of the invention; and FIG. 13 is a schematic side view of an alternate embodiment of the invention.

DETAILED DESCRIPTION OF THE PREFERRED EMBODIMENTS

Figure 3:
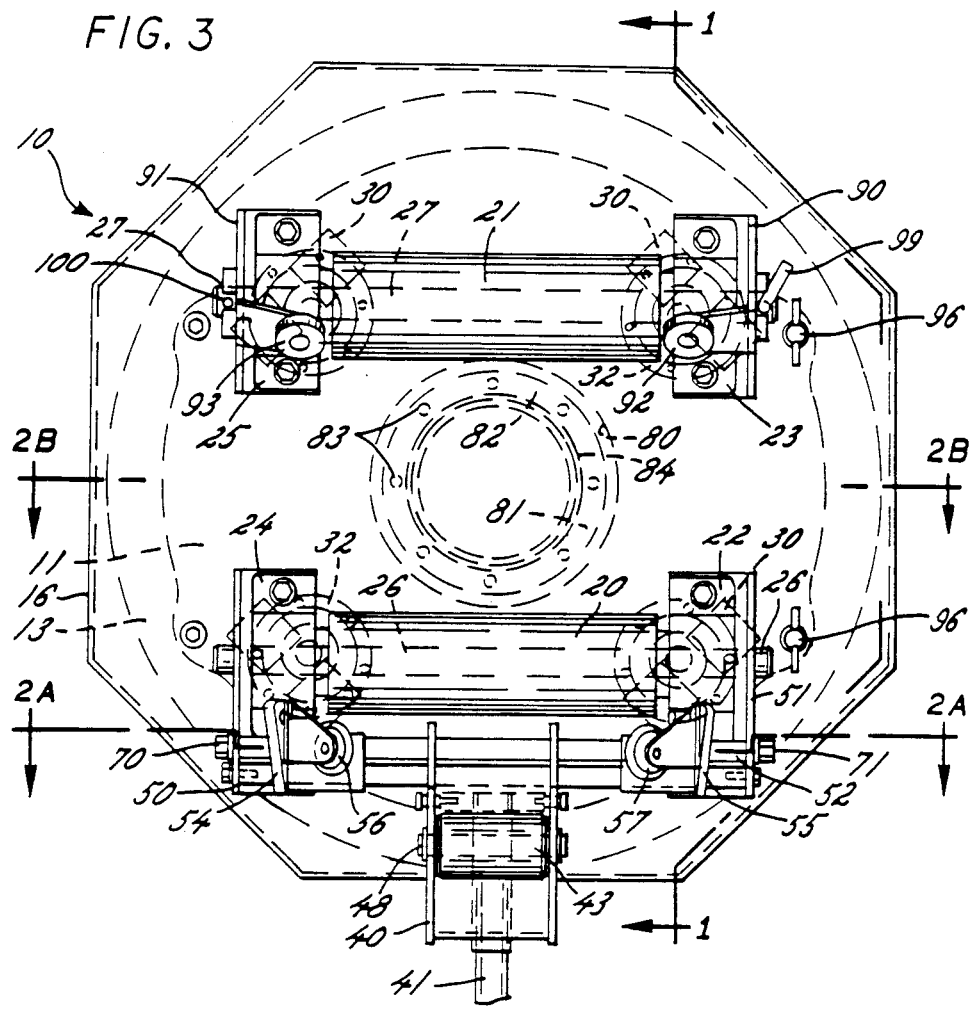
FIG. 3 is a plan view of the device of FIG. 1 with the cut away position shown.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning first to the embodiment shown in FIGS. 1-5, in FIG. 1 there is shown a diagnostic device 10 constructed in accordance with the principles of the instant invention. Diagnostic device 10 includes a support 11 having a horizontal upper surface 12. Diagnostic device 10 has a platform 13 which is movably coupled to support 11. Platform 13 has an upper side 14 and a lower side 15. An exterior housing 16 is affixed to upper side 14 of platform 13.

A front support roller 20 and a rear support roller 21 are connected to upper side 14 of platform 13. The front and rear support rollers 20, 21 are rotatably connected to platform 13 by means of pillow blocks 22, 23, 24 and 25. One suitable pillow block is available as a Dodge S 2000 spherical roller bearing sold by Reliance Electric Co., 2 Roper Court, P.O. Box 499, Greenville, S.C. 29602. Each of the pillow blocks 22 and 24 are affixed to the platform 13 and have bearings which allow the front axle shaft 26 of front support roller 20 to cycle. Each of pillow blocks 23 and 25 are affixed to platform 13 and have bearings which allow the rear axle shaft 27 of rear support roller 21 to cycle. The front and rear support rollers 20, 21 provide rolling surfaces which contact the tire tread of a tire of a vehicle and will allow the tire of the vehicle to cycle when placed upon the support rollers 20, 21. While the material used and the surface of the support rollers 20, 21 may be tailored to a specific application or test to be performed, in a preferred embodiment of the invention, the support rollers 20, 21 are made of a desirable low friction material such as a light colored Delrin plastic. One source of Delrin plastic is McMaster-Carr. A light color Delrin plastic is preferred so that when there is tire scrub caused from some defects such as irregular treads, the rubber which rubs off on the support roller can easily be seen, thereby giving a visual indication of some tire problems. The front axle shaft 26 is parallel to rear axle shaft 27 and preferably made of steel. The front and rear roller supports are about four inches in diameter and are generally about ten inches apart at their closest points.

The platform 13 has glide bearings 30 attached to it. The glide bearings 30 include ball bearings 31 which allow platform 13 to glide horizontally in any direction along the horizontal upper surface 12 of the support 11.

The support 11 has foot bearings 32 having spring loaded bearings 33. The foot bearings 33 allow the diagnostic device 10 to be moved along a floor when the weight of a vehicle is not placed on diagnostic device 10. But, when the weight of a vehicle is placed upon diagnostic device 10, the spring loaded bearings 33 retract to allow the lower surfaces 34 of foot bearings 32 to support diagnostic device 10 and keep the support 11 from moving.

Figure 5:
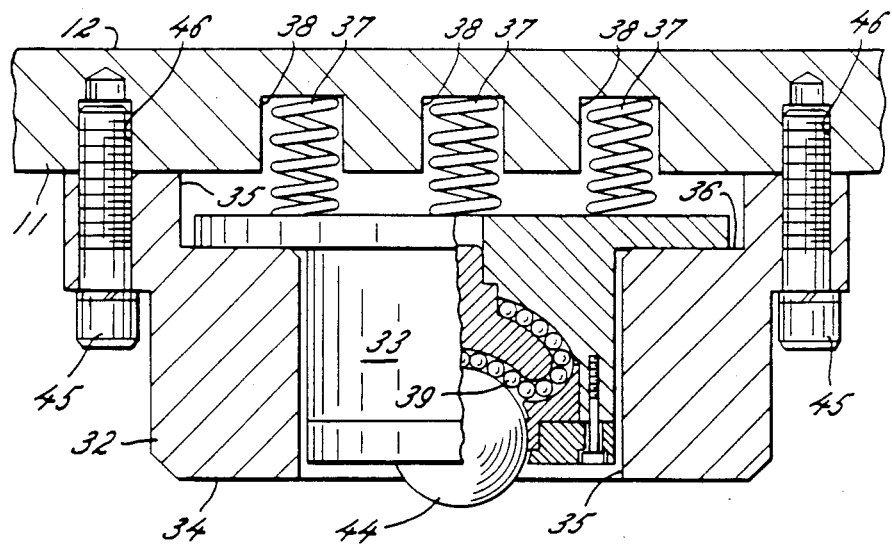
FIG. 5 is a partial section view of a component of the device of FIG. 1.

FIG. 5 shows a partial sectional view of a foot bearing 32. The foot bearing 32 has a central cavity 35 which allows bearing 33 to slide vertically up or down. Downward movement of bearing 33 is restricted by the horizontal surface 36 of central cavity 35. Upward movement of bearing 33 is restricted by springs 37. Springs 37 fit in appropriate recesses 38 in support 11. Internal balls 39 allow ball bearing 44 to freely rotate. The entire foot bearing 32 is affixed to support 11 by bolts 45 attached to threaded recesses 46 in support 11.

The spring loaded bearings 32 and the glide bearings 30 can be made of bearings that will provide 360° freedom of movement. It is preferred that the glide bearing 30 be fixed to the lower side of the platform under the portion of the platform that bears the weight of the support rollers 20, 21. Some suitable bearings are made by General Bearing Corporation, Route 303, Blauvelt, N.Y. 10903, and sold as Genbearco Autotrack Ball Transfers 1251, and part numbers 1261 and 1262.

The gliding action of the platform 13 allows the tires to maintain their lowest center of gravity relationship to the free-spinning pair of support rollers 20, 21, thereby allowing the support rollers 20, 21 to move perpendicularly to the tire and thus restrict lateral walking. This is unlike a situation in a dynamometer, where the tire will want to walk completely off the rollers of the dynamometer but cannot because the vehicle is chained. Thus, in a dynamometer the tire will never be relaxed but will be exerting forces against the rollers. Additional complications in a dynamometer are caused by its rollers, which support both tires of an axle so that each tire works with or against the other tire.

A front retention bracket 40 is affixed to upper side 14 of platform 13. A handle 41 can be removably connected to front retention bracket 40 to aid a user in moving diagnostic device 10 around a floor 42 while there is no vehicle placed upon the diagnostic device 10. The front retention bracket 40 includes a front retention roller 43 which will inhibit a vehicle from running forward off the diagnostic device 10 or throwing the diagnostic device 10 behind or from under the tire in case of tipping or locking of the device 10 or its components. The front retention roller 43 is rotatably connected by bearings 47 to front retention roller axle 48.

Side retention brackets 50 and 51 include an alignment shaft 52 and a threaded shaft 53 which provide support for two side retention assemblies 54, 55. The side retention assemblies 54, 55 include offset casters 56, 57. As best seen in FIG. 2, the offset caster 56 includes a wheel 58 rotatably connected by a center axle 60 to a caster housing 62. The caster housing 62 is rotatably connected by an offset axle 64 to side retention assembly 54. The center axis of offset axle 64 is offset from the center axis of center axle 60 of wheel 58. Similarly, the offset caster 57 includes a wheel 59 rotatably connected by a center axle 61 to a caster housing 63. Caster housing 63 is rotatably connected by an offset axle 65 to side retention assembly 55. The center axis of offset axle 65 is offset from the center axis of center axle 61 of wheel 59.

As best seen in FIG. 1, offset caster 57 will normally hang down. Phantom position 66 of offset caster 57 shows a possible alignment of offset caster 57 when it is contacted by a cycling tire supported on front support roller 20 and rear support roller 21. The offset casters 56, 57 of the side retention assemblies will self-align to different size tires. Although this generally eliminates the need for an operator to make adjustments for different tire sizes, an operator may adjust the distance between the casters 56, 57 when a wide range of tire sizes are tested. The offset casters 56, 57 will restrict the tires from laterally walking off of the support rollers and from contacting any of the obstructions on top of the diagnostic device. This prevents damage to the side walls of the tires and keeps the vehicle on the support rollers 20, 21 without chaining the vehicle down. This placement of offset casters 56, 57 over the end of each front support roller redirects the tire back toward the center of the support rollers.

Side adjustment hexheads 70 and 71 allow threaded shaft 53 to be turned to drive side retention assemblies 54 and 55 toward or away from one another. A user can drive hexheads 70 and 71 with a wrench or by a suitable electric or pneumatic drill. Threaded shaft 53 is rotatably connected to side retention brackets 50 and 51 by shaft bearings 68. Threaded shaft 53 is rotatably connected to front retention bracket 40 by shaft bearings 69. Threaded shaft 53 is reverse threaded on each side so that as it is rotated in one direction side retention assemblies 54 and 55 move away from each other, and as threaded shaft 53 is rotated in the opposite direction, side retention assemblies 54 and 55 move toward each other. Side retention assemblies 54, 55 are threaded to match the respective thread of threaded shaft 53. Side retention assemblies 54, 55 have shaft bearings 72, 73 which allow the side retention assemblies 54, 55 to slide along alignment shaft 52. The side retention assemblies 54 and 55 can be used to center the tire on the support rollers 20, 21. A force can be exerted upon the tire by offset casters 56 and 57. Similarly, if a tire wants to travel off of support rollers 20 and 21 it will be restricted by one of the offset casters 56 or 57.

As best seen in FIGS. 2 and 3, the support 11 has an inner opening 80. A range restrictor 81 is affixed to the lower side 15 of the platform 13. The range restrictor 81 has a lip 82 which allows it to be affixed to platform 13 by bolts 83. The range restrictor 81 has a side wall 84 which restricts the horizontal travel of the platform 13 over the support 11.

During use, platform 13 can glide horizontally over support 11 freely until sidewall 84 contacts inner opening 80. When that occurs, then the tire will exert a force against the diagnostic device 10 that will cause it to travel. If this occurs, the operator should lift the vehicle from diagnostic device 10 and reposition diagnostic device 10 so that the platform 13 can move freely. In use it has been found that allowing platform 13 to travel from one inch to one and one-half inch in any direction from center is adequate for most vehicle applications. It is desirable to have the travel be one and one-half inch from center or a total of three inches from side to side total travel.

As best seen in FIG. 3, rear retention brackets 90, 91 are affixed to the upper side 14 of the platform 13. Rear retention wheels 92, 93 are rotatably connected to the rear retention brackets 90, 91. As best seen in FIG. 1, the rear retention wheel 93 rotates around rear retention wheel axle 95. Generally, in this embodiment, the rear retention wheels 92 and 93 will not contact a tire when the tire is being cycled in a forward rotation. However, if an operator should cycle the tire in a reverse rotation, the tire may want to travel off the rear support roller 21. Then, one of the rear retention wheels 92 or 93 will restrict the tire from leaving the rear support roller 21.

Figure 4:
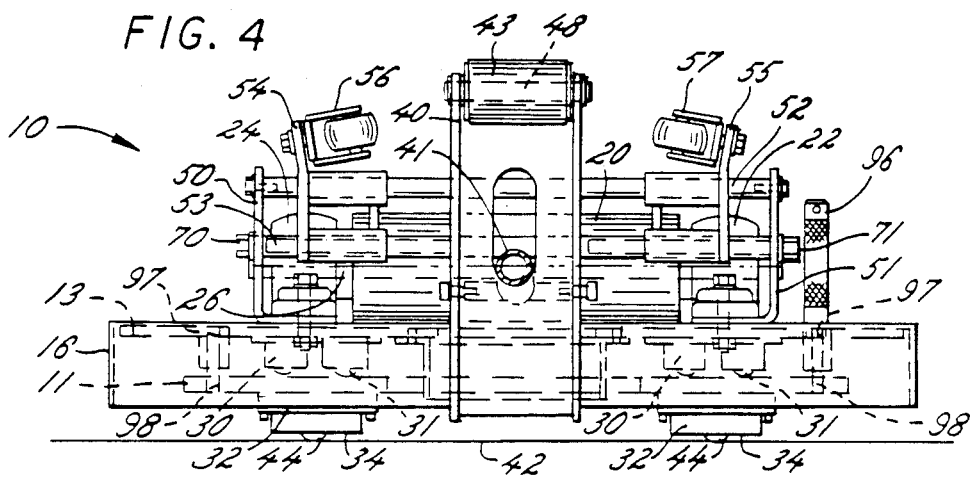
FIG. 4 is an elevation view of the device of FIG. 1.

As seen in FIGS. 1, 3 and 4, two centering lock pins 96 connect the platform 13 and the support 11 in a centered position and when fastened restrict horizontal gliding movement between the platform 13 and the support 11. The centering lock pins 96 pass through centering lock holes 97 in the platform 13 and fasten into centering lock pin channels 98 in the support 11. The centering lock pins 96 are fastened while diagnostic device 10 is moved around and positioned under the tire of a vehicle and while the vehicle is lowered upon diagnostic device 10. This allows the diagnostic device to self center to the tires of the vehicle. They are then released to allow the platform 13 to glide horizontally over the support 11 as the appropriate tire is cycled upon diagnostic device 10.

A support roller lock 99 passes through the rear axle shaft 27 of the rear support roller 21 into a support roller lock channel 100; when it is in locking position, it restricts the rear support roller 21 from rotating. The support roller lock 99 restricts the rear support roller 21 from rotating and provides enough traction for the tire to not rotate upon the diagnostic device 10. For some testing operations it may be desirable to have a wheel not move (such as in testing differentials or individual wheels). For those tests, the support roller lock 99 is inserted to lock that particular wheel. A safety feature of the support roller lock 99 is that it cannot be inserted while a wheel is cycling. In most operations of diagnostic device 10, support roller lock 99 is removed from diagnostic device 10 so as to allow rear support roller 21 to spin freely. The support roller lock 99 allows an operator to study the motion of a pre-selected wheel individually. By locking one support roller, the vehicle's differential is forced to drive the opposite tire. Only one support roller lock 99 is supplied per set of diagnostic devices to hinder an operator from locking support rollers for both wheels of the same axle simultaneously. However, even if an operator did lock both support rollers for both wheels of the same axle, the tires would slip on the Delrin plastic of the support rollers due to the Delrin plastic's low friction characteristics.

Figure 6:
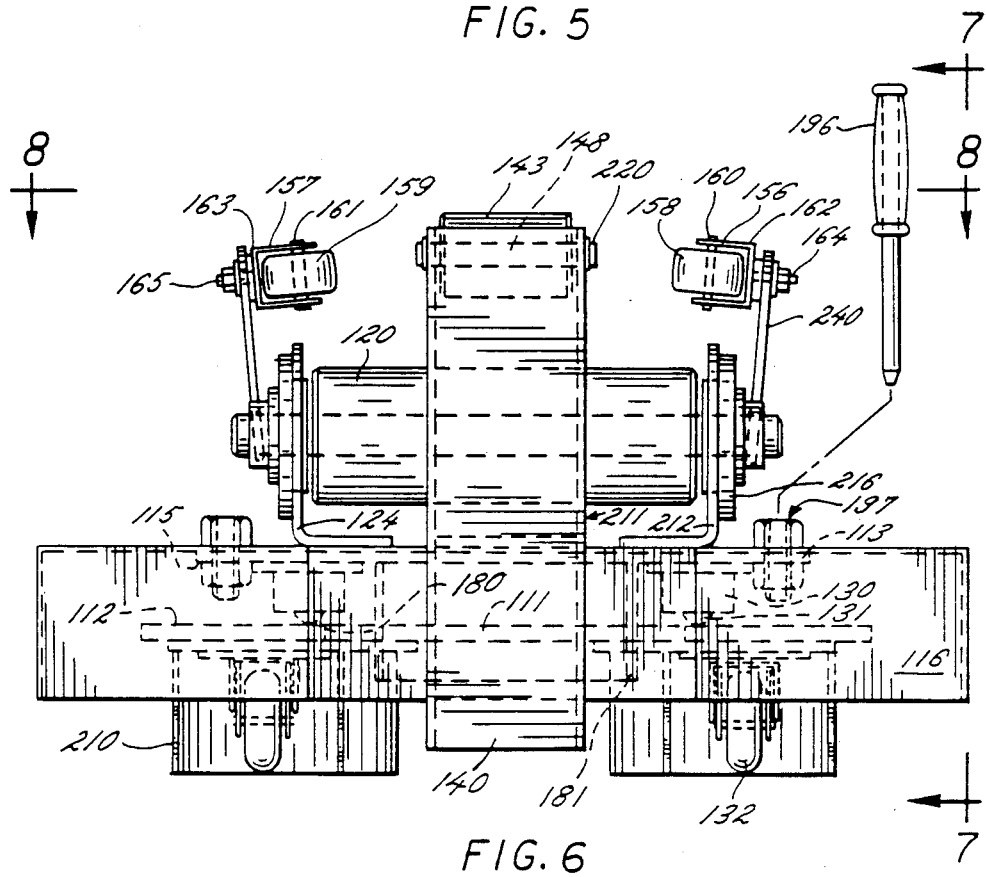
FIG. 6 is a plan view of an alternate embodiment of the invention.
Figure 7:
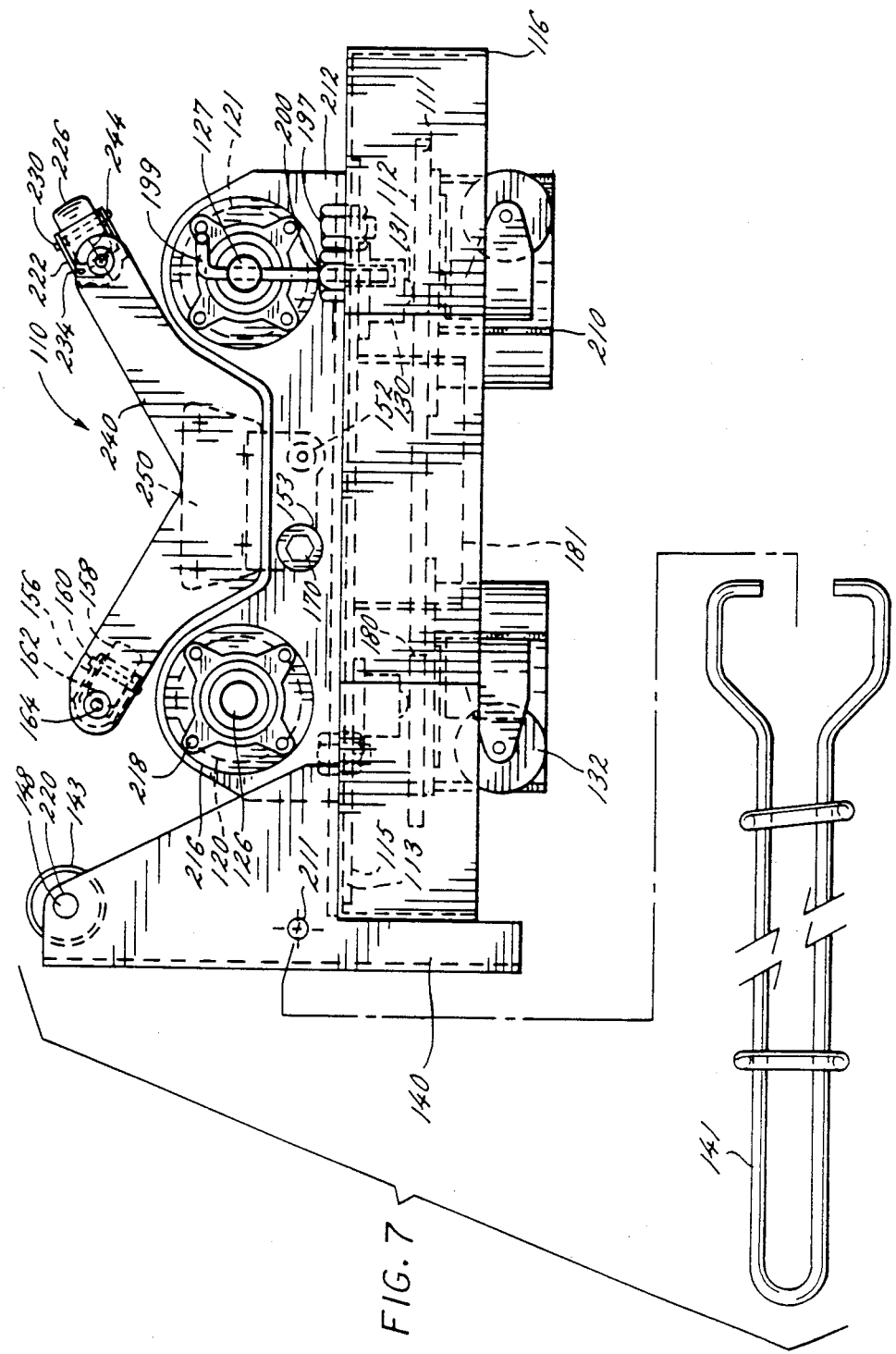
FIG. 7 is a side view of the embodiment of FIG. 7 taken generally along line 8—8 in FIG. 7.
Figure 8:
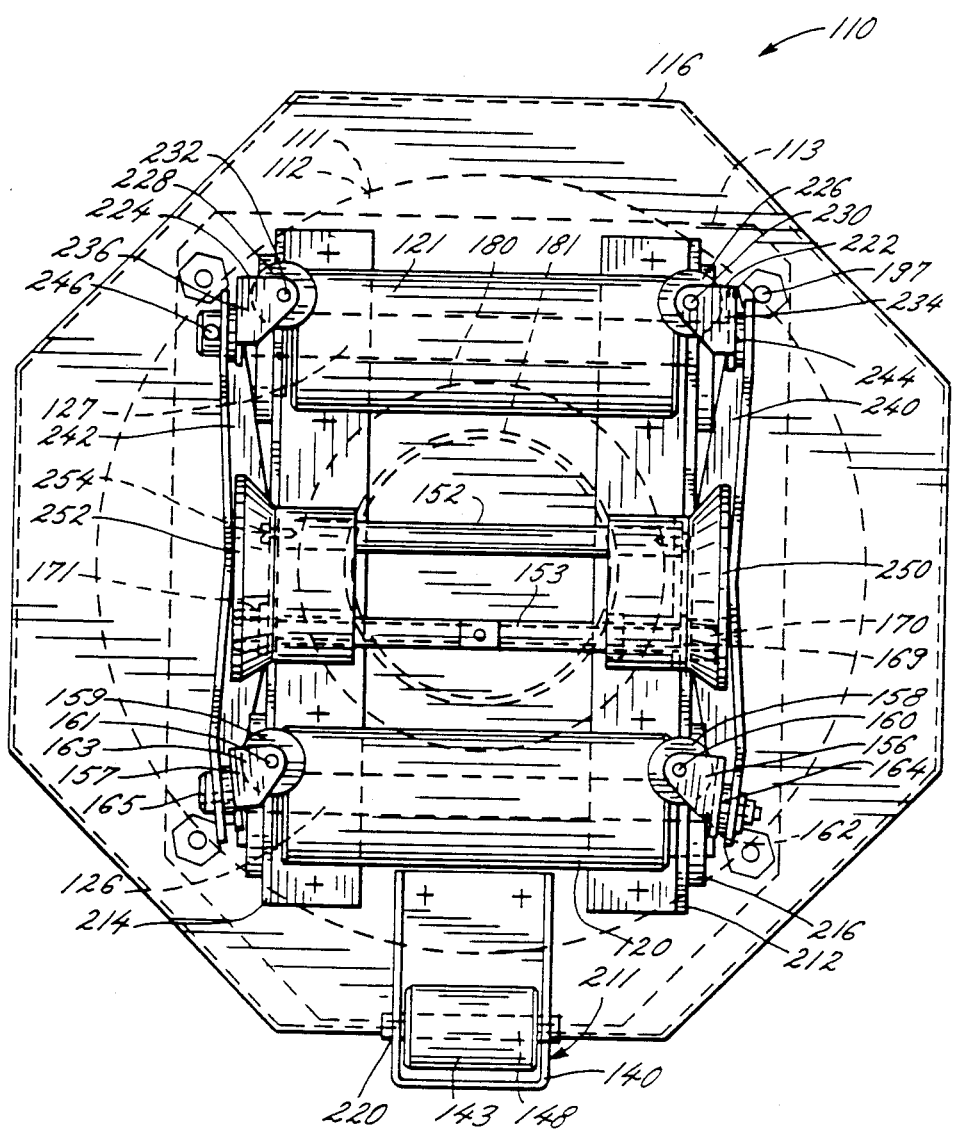
FIG. 8 is a top view of the embodiment of FIG. 7 taken generally along line 9—9 in FIG. 7.

An alternate, preferred embodiment of the invention is shown in FIGS. 6–8. In describing this embodiment, those components which are similar to the components of the first embodiment will be designated by the assigned number of the first embodiment plus one hundred, i.e., the device will be designated as 110 rather than 10, etc.

Turning first to FIGS. 6 and 7, the diagnostic device 110 includes a support 111 which has a horizontal upper surface or plate 112 and downwardly extending side walls 210. So that the support 111 may be moved along a floor and properly positioned under the vehicle, the support 111 is provided with conventional spring loaded casters 132, rather than the foot bearings 32 of the embodiment in FIGS. 1–4. In this way, the support 111, and consequently the device 110 may be moved along a floor when the weight of the vehicle is not placed on the device 110. When the weight of the vehicle is placed on the device 110, the spring loaded casters 132 will retract to the position shown in FIGS. 6 and 7 so that the lower surfaces of the downwardly extending side walls 210 will contact the floor and prevent the support 111, and consequently the device 110 from further movement.

In a manner similar to that described in connection with the first embodiment, the platform 113 is supported on the support 111 by glide bearings 130 mounted to the lower of the platform 113. In this way, the glide bearings 130, which include ball bearings 131, permit the platform 113 to glide horizontally in any direction along the upper surface of the support 111. In order to limit the distance that the platform 113 may travel relative to the support 111, a range restrictor 181 is mounted to the lower surface 115 of the platform 113. The range restrictor 181 may be mounted to the platform 113 by any suitable means, such as the lip 82 and bolts 83 shown in the embodiment of FIG. 2 or welds as shown in FIGS. 6 and 7. The downwardly extending side walls of the range restrictor 181 are received in a central inner opening 180 in the upper horizontal plate 112 of the support 111. In this way, the horizontal gliding movement of the platform 113 will be arrested when the range restrictor 181 moving within the central opening 180 contacts the upper horizontal plate 112 of the support 111.

In order to prevent debris or other items from interfering with the movement of the glide bearings 130 along the upper horizontal plate 112, an exterior housing 116 is affixed to the upper side of the platform 113. The horizontal upper surface and depending side walls of the exterior housing 116 prevent debris and other items from entering the area between the platform 113 and the upper horizontal plate 112. Additionally, the exterior housing 116 gives the unit a clean appearance.

So that the device 110 may be easily moved along the floor and properly positioned under the vehicle as described in connection with the first embodiment, the platform 113 may be centered on the support 111 and locked in position by two centering lock pins 196, as shown in FIG. 6. The lock pins 196 extend through holes 197 in the platform 113 and fasten into centering lock pin channels 198 in the support 111, as shown.

To further assist an operator in maneuvering and properly positioning the device 110, a handle 141 is provided, as shown in FIG. 7. The handle 141 may be easily assembled into openings 211 in the front retention bracket 140, which is secured to the platform 113 at the front of the device 110. Once the device 110 is positioned, the handle 141 may be removed to eliminate the possibility of tripping the operator or other people in the shop area.

In order to rotatably support a tire on the device 110, front and rear support rollers 120, 121, which may be made of materials such as steel or Delrin plastic, as described in the first embodiment, are mounted for rotation on the platform 113. The rollers 120, 121 are coupled to the platform 113 by support brackets 212, 214. The support brackets 212, 214 may be generally L-shaped and secured to the platform by any suitable means such as bolts (not shown) extending through the base of the bracket 212, 214 and the platform 113 or by welding, as shown in FIGS. 6–8. Because one end of each roller 120, 121 is supported in the L-shaped support bracket 212, and the opposite end of each roller 120, 121 is supported in the other L-shaped support bracket 214, the support brackets 212, 214 will maintain the rollers 120, 121 in substantially parallel positions to ensure proper operation of the device 110.

In order to further support the rollers 120, 121, and therefore the weight of the vehicle, rigid support braces 216 are assembled into openings in the vertically extending portion of the support brackets 212, 214 and are secured to the brackets 212, 214 by way of bolts 218 or other suitable means. In this way, the axle shafts 126, 127 of the front and rear support rollers 120, 121 are rotatably supported in a central opening extending through the rigid support braces 216. In the embodiment illustrated in FIGS. 6–8, the support rollers 120, 121 are spaced away from the exterior housing 116. In this way, rocks or other debris will not wedge between the support rollers 120, 121 and the housing 116 and mar the surface of the rollers 120, 121.

In order to restrict the rear support roller 121 from rotating, a support roller lock 199, as shown in FIG. 7, may be assembled through the rear axle shaft 127 of the rear support roller 121 and into a support roller lock channel 200 provided in the platform 113. In this way, the support roller lock 199 prevents the rear support roller 121 from rotating, and the stationary support roller 121 provides sufficient traction to prevent a supported tire from rotating upon the device 110. Consequently, the device 110 may be used to study the motion of a pre-selected wheel individually, as described in connection with the first embodiment. Similarly, if the rollers 121 of devices 110 supporting both wheels of an axle are locked, the tires will slip on the Delrin plastic of the support rollers due to the low friction characteristics of Delrin plastic.

In order to inhibit a vehicle from running forward off of the diagnostic device 110 or throwing the device 110 from under the tire in case of tipping or locking of the diagnostic device 110 or its components, the invention provides a front retention roller 143, similar to the front retention roller 43 of the first embodiment. The front retention roller 143 is rotatably connected to the front retention roller axle 148 by way of bearings (not shown in FIGS. 6–8). The axle 148 is assembled in the front retention bracket 140 and may be secured by snap rings 220 or other similar devices In order to assist in centering a tire on the support rollers 120, 121 and to restrict a tire from laterally walking off of the support rollers 120, 121 or from contacting any of the obstructions on the top of the diagnostic device 110 during operation, the invention provides front offset casters 156, 157 and rear offset casters 222, 224. Each caster 156, 157, 222, 224 includes a wheel 158, 159, 226, 228 which is rotatably connected by a center axle 160, 161, 230, 232 to a caster housing 162, 163, 234, 236. It is preferable that the face of the wheels 158, 159, 226, 228 be rounded in order to ensure better contact with the tire, and therefore more effective operation of the casters 156, 157, 222, 224. While the wheels 158, 159, 226, 228 may have an alternate base curvature, a 0.025 inch radius of curvature has been found to result in effective operation of the casters 156, 157, 222, 224.

In order to position the casters 156, 157, 222, 224 along the side walls of the tire in this embodiment of the invention, yokes 240, 242 are provided along opposite sides of the tire. Although the yokes 240, 242 may be made of a number of materials, in the embodiment shown in FIGS. 6-8, the yokes 240, 242 are made of stamped steel. The casters 156, 157, 222, 224 are rotatably connected to the yokes 240, 242 by way of offset axles 164, 165, 244, 246, the center axes of the offset axles 164, 165, 244, 246 being offset from the center axes of the center axles 160, 161, 230, 232 of the wheels 158, 159, 226, 228. The yokes 240, 242 are supported by yoke supports 250, 252, which are disposed along the inside surfaces of the L-shaped support brackets 212, 214, as best shown in FIG. 8. The yoke supports 250, 252 may be fabricated from any suitable materials; in this embodiment, the yoke supports 250, 252 are metal castings. The yokes 240, 242 may be secured to the yoke supports 250, 252 by any suitable means such as bolts, or by welding.

So that the device 110 may be used for tires having a wide range of widths, the distance between the front casters 156, 157 and the distance between the rear casters 222, 224, may be adjusted. While means may be provided to individually adjust the location of each caster 156, 157, 222, 224, in the embodiment shown in FIGS. 6-8, the distance between the yokes 240, 242 may be easily adjusted in order to simultaneously adjust the distance between the front casters 156, 157, and the distance between the rear casters 222, 224. The yoke supports 250, 252 are disposed for axial movement along a threaded shaft 153 and an alignment shaft 152 in a similar manner to that described in connection with the first embodiment. The alignment shaft 152 extends through bores in the yoke supports 250, 252 and is secured to the support brackets 212, 214 by way of a bolt 254. So that the yoke supports 250, 252 will slide axially along the alignment shaft 152, the yoke supports 250, 252 are provided with shaft bearings similar to the bearings 73 illustrated in the embodiment shown in FIG. 2.

The threaded shaft 153 extends through matching threaded bores in the yoke supports 250, 252 and shaft bearings 169 disposed in the support brackets 212, 214. Side adjustment hexheads 170, 171 are secured to the ends of the threaded shaft 153 so that rotation of either hexhead 170, 171 by a wrench or other suitable device will rotate the shaft 153 with respect to the yoke supports 250, 252 and the support brackets 212, 214. Consequently, rotation of either hexhead 170, 171 will cause the yoke supports 250, 252 to move axially along threaded shaft 224 and the alignment shaft 226.

So that the yoke supports 250, 252 and therefore the casters 156, 157, 222, 224 slide an equal distance toward or away from each other as the threaded shaft 153 rotates, the shaft 153 is provided with opposing threads. In this way, the casters 156, 157, 222, 224 may be easily adjusted to center the tire on the support rollers 120, 121 or to exert a force on the sidewalls of the tire.

In order to ensure the most effective operation of the device 110, the front and rear casters 156, 157, 222, 224, may have different positions relative to the tire. In this way, the device 110 may be tailored to test different types of tires with different profile, curvature, or flex. It has been determined that for most types of testing, the device 110 operates most effectively when the front casters 156, 157 are angled in toward the tire, and the rear casters 222, 224 are angled out away from the tire. Further, the front casters 156, 157 may be disposed slightly closer to the tire than the rear casters 222, 224.

The positioning of the casters 156, 157, 222, 224 to provide optimum trailing operation may be accomplished using a number of methods or combinations of methods. For example, both the yokes 240, 242 and the yoke supports 250, 252 may be designed to achieve desired angles. In the embodiment shown in FIGS. 6-8, the yoke supports 250, 252 are designed to angle the yokes 240, 242 away from the tire at approximately 5.0° from a vertical plane perpendicular to the axes of the support rollers 120, 121. It will be appreciated that the yokes 240, 242 could be angled toward or away from the tire on the order of 0-15° from vertical. Further, the front arms of the yokes 240, 242 are angled toward the tire and the rear arms of the yokes 240, 242 are angled away from the tire. It has been determined that for most types of testing of normal passenger car tires, it is desirable to angle the front arms in toward the tire approximately 7.5°, and the rear arms away from the tire approximately 7.5°. It will be appreciated by one skilled in the art that the yokes 240, 242 and yoke supports 250, 252 could be of alternate designs to achieve a desired caster 156, 157, 224, 226 relationship to the tire.

The yokes 240, 242 are angled such that the front casters 156, 157 are disposed slightly closer to the tire than the rear casters 222, 224. In the preferred embodiment of the invention shown in FIGS. 6-8, the front casters 156, 157 are disposed about one-half inch closer to the tire than the rear casters 222, 224. It has been determined that the device 110 operates most effectively when this differential is on the order of $\frac{1}{8}$ to $\frac{1}{2}$-inch with the minimum spacing being dependent on the irregularity of the tire.

Under normal operation, when the tire is cycled in a forward direction, the rear wheels 226, 228 will not generally contact the tire. However, because the rear wheels 226, 228 are disposed relatively close to the tire, if the tire is cycled in the reverse rotation, the wheels 226, 228 will prevent the tire from cocking at an angle on the support rollers 120, 121, and from being damaged by contacting the support brackets 212, 214. Further, the rear wheels 226, 228 help to center the tire on the support rollers 120, 121 and maintain parallel contact on the rollers 120, 121 to ensure proper operation of the diagnostic device 110 when the tire cycles in a reverse direction. Consequently, the relative position of the rear wheels 226, 228 to the tire will permit testing of the vehicle when operated in reverse.

FIG. 9 shows a height matching block 260 which may be used in conjunction with the either of diagnostic devices 10 or 110. The block 260 has inclined surfaces 262 and 264. The inclined surfaces 260 and 262 are designed so that the tire of a vehicle will be the same height off the ground as if it were placed on diagnostic device 10 (i.e., with spring loaded bearings 33 retracted and lower surfaces 34 of foot bearings 32 touching the ground in the first embodiment shown in FIGS. 1-5, or, alternately, on device 110 with the spring loaded casters 132 retracted and the downwardly extending sidewalls 210 of the support 111 touching the ground in the second embodiment shown in FIGS. 6-8). To provide for normal operating angles, each tire of a vehicle should rest upon a diagnostic device 10, 110, a height matching block 260 or other suitable means to maintain all of the tires in substantially the same plane.

In use of the diagnostic device of the instant invention, a vehicle is first raised on a hoist. Although devices may be positioned under one or all of the tires so long as the remaining tires are supported on height matching blocks, generally two diagnostic devices are placed under the tires of one axle of a vehicle and two height matching blocks are placed under the tires of the other axle of the vehicle. The diagnostic devices have their centering lock pins inserted so that the platform is locked to the support and the lock pins are inserted in the side of the diagnostic device on the outside of the vehicle. The support roller lock is removed to allow the self-centering action of the diagnostic device. The side assemblies supporting the offset casters are tightened so they are close to the tires to align the diagnostic device so that the tire is centered within the diagnostic device. The vehicle is then slowly lowered onto the diagnostic devices and the height matching blocks. The height matching blocks are centered manually, while the diagnostic devices center themselves as the weight of the vehicle is placed on the unit. This is accomplished by spring loaded supports (spring loaded bearings 33 in the first embodiment shown in FIGS. 1-5; spring loaded casters 132 in the second embodiment shown in FIGS. 6-8) allowing the diagnostic device to move along the floor as the spring loaded supports are being withdrawn into their housings. When the weight of the vehicle overcomes the spring force, the foot bearing lower surfaces in the first embodiment, or the housings of the spring-loaded support in the second embodiment contact the ground to provide a firm footing. The side assemblies are then backed away from the tires to that the casters do not contact the tires for most applications and the centering lock pins are removed from both diagnostic devices.

If only one wheel is to be cycled, then the support roller lock is inserted. The wheels of the vehicle placed on the diagnostic devices can then be cycled or steered as desired. The tires are cycled for a period of time in order to bring the tires up to a normal operating temperature because the tires behave differently if cool. The vehicle can then be tested at its full range of speeds up to the highest speed of the vehicle. Many of the tests require highway speeds of forty to eighty miles per hour.

It has been found that a device constructed in accordance with the instant invention can be used to test for the following problems in a vehicle:

I. TIRES
  A. Lateral Run-Out
  B. Radial Run-Out
    1. side wall stiffness variation
  C. Tire Noise
  D. Conicity
  E. Camber Pull
  F. Belt Separation
II. WHEELS
  A. Lateral Run-Out
  B. Radial Run-Out
  C. Vibration
  D. Noise
    1. Lug Bolts
    2. Hub Caps
    3. Wheel
III. STEERING (Front Wheel Drive)
  A. Looseness
  B. Non-Free Flowing Pull
  C. Wander
  D. Cornering Return
IV. FRONT DRIVE AXLES
  A. Constant Velocity Joints
    1. Inner
    2. Outer
    3. Boots
    4. Noise
  B. Wheel Bearings
    1. Noise
    2. Vibration
V. PROPELLER (Drive Shaft) REAR DRIVE
  A. Drive Line Vibration
  B. Noise
  C. Looseness
  D. Center Carrier Bearings
  E. U-Joints
VI. FINAL DRIVE (Differential)
  A. Pinion Noise
    1. Bearings
    2. Looseness
  B. Ring Gear
    1. Noise
    2. Looseness
  C. Carrier Side Bearing
    1. Noise
    2. Looseness
    3. Spider Gears
  D. Rear Axle Shaft
    1. Bearing
    2. Run-Out
VII. FRONT SUSPENSION
  A. Upper Control Arm Bushings
  B. Lower Control Arm Bushings
  C. Strut Rod Bushings
  D. Springs
VIII. BRAKES
  A. Emergency
  B. Automatic Braking System
  C. Noise
IX. CLUTCH
  A. Chatter
  B. Vibration
X. MANUAL TRANSMISSION
  A. Noise
  B. Vibration
XI. AUTOMATIC TRANSMISSION
  A. Noise
  B. Vibration
  C. Torque Converter Lock Up
XII. ENGINE
  A. Noise
  B. Accessory Drive
  C. Vehicle Computer Controls
  D. Vibrations
  E. Exhaust
    1. Noise
    2. Vibration During use of the device of the instant invention, problems or defects in the tire or wheel or chassis components can be detected visually, audibly and by touch. In observation of a problem an operator can synchronize the noise with the movement which can be observed both visually and through sensing movement. This is an advantage over dynamometers which have large hollow drums which generate levels of sound which mask the sounds of the tire or chassis problem. An operator can use a sound level meter by holding it near to a problem tire and the needle will indicate a noise vibration as the irregular portion of the tire contacts the support roller. This technique is useful at very low speeds of tire cycling to detect belt separation or tread irregularity.

During the testing of many tire and chassis problems, movement of the platform may indicate certain types of problems. For example, for a tire that is radially out of round, the platform moves front to back repeatedly. For a tire that is laterally out of round, the platform moves side to side repeatedly. For problems which occur only at certain speeds the wheel can be driven at precisely that speed in order to observe the problem and determine the cause.

The response of a vehicle to road inputs may be simulated by a number of methods. For example, the tire may be easily modified by attachment of a cable across the tread of the tire to yield a repetitive input as the tire cycles. Alternately, the surface of one or both of the parallel support rollers may provide a predictable input to the tire. For example, the surface of the roller may be irregular or the roller may not be perfectly round. In this way, the roller may simulate various types of roads to duplicate a problem.

The diagnostic device allows an operator to predetermine the operating angles desired. The diagnostic device absorbs the forces generated by a cycling and turning wheel, the vehicle can be left on a hoist with all or part of the vehicle's weight on the diagnostic device. That will simulate normal or unweighed road conditions. The diagnostic device allows for steering applications with the vehicle maintaining its proper operating angles. Chassis dynamometers in which both wheels of a vehicle axle are supported on fixed parallel rollers are inappropriate for steering applications.

The free floating platform allows a separate unit to absorb forces for each individual wheel. In cycling or turning applications which otherwise would redirect forces caused by resistance of the tires or other defects in the mechanics or chassis of the vehicle back to the vehicle, the movement is transferred to the diagnostic devices with virtually no resistance of the diagnostic device itself. Since the support rollers are on the floating platform, the support rollers adjust to the tires instead of the vehicle moving to adjust to the support rollers. Thus, as the tire is placed on the device and rotated, the support rollers and the floating platform will adjust so that the tire will locate with its center of gravity at the lowest position relative to the platform and reach a dynamic equilibrium. The combination of the platform and the support creates a floating field under the support rollers which allows the configuration of a tire and the gravitational pull on the vehicle to move the support rollers in such a way that virtually no forces are transferred to the vehicle and which allow the vehicle to remain stationary no matter what position the tires are in. Of course, the vehicle may vibrate, bounce, or sway as a vehicle does upon a road surface, but the vehicle will not tend to move sideways or forwards or backwards off the diagnostic devices.

When it is desired to cycle a non-drive tire, the operator may cycle it by hand or by any type of drive mechanism. It will be appreciated by those skilled in the art that the tire may be cycled directly, or one or both of the support rollers may be cycled in order to cycle the tire. For example, the drive mechanism can include a driven roller which contacts the tire tread directly to cycle the tire. The placement of the drive force other than through the support rollers of the invention, allows the support rollers to remain free-spinning and prevents the support rollers from locking up and creating a friction base for the tires to grab. This inhibits the vehicle from leaving the diagnostic device. Additionally, using a low friction material for the support roller causes the wheel to slide over two locked support rollers.

It will be appreciated that the device may be utilized in testing a wide range of vehicles. For example, four-wheel drive and four-wheel steerable vehicles may be tested by supporting each of the four wheels on a diagnostic device. In this application, no height matching blocks are utilized.

Further, the device may be used to test tandem axle and dual-wheel vehicles, as shown schematically in FIGS. 10–13. It will be appreciated that the schematic figures do not include all of the components contemplated, only those necessary to relate these alternate embodiments to those discussed above.

In dual-wheel vehicles, a single axle is provided with the two wheels at each end. In testing dual-wheel vehicles, each wheel may be supported on a separate device or both wheels on an end of the axle may be supported on a single device having a single pair of support rollers. As shown in FIG. 10, the tires may be supported on a single pair of support rollers 320 that are rotatably supported on the platform 313. The platform 313 is glideably supported on the support 311 by glide bearings 330. The support 311 is supported on the ground by casters or other suitable devices 332. The embodiment illustrated shows a front retention roller 343, which is rotatably supported on the platform 313 by the front retention bracket 340. Front and rear side retention rollers 356, 322 are disposed along the side of the first tire by yoke 341. Front and rear side retention rollers 357, 324 are disposed along the opposite side of the second tire by yoke 342. In this way, the front and rear side retention rollers 356, 357, 322, 324 prevent the pair of tires from traveling off of the rollers 320.

Alternately, as shown in FIG. 11, a single device 410 may be provided with two sets of support rollers 420, 420a supported on two platforms 413, 413a to support dual wheels. The platforms 413, 413a are independently glideably coupled by glide bearings 430, 430a to a single support 411. A single front retention roller 443 and pairs of front and rear side retention rollers 456, 457, 422, 424 are disposed along one wheel in the embodiment shown, although it will be appreciated that the other wheel could likewise be provided with retention rollers.

In tandem axle vehicles, two axles are disposed relatively close together. In a manner similar to that described above, the tandem axle wheels along a side of the vehicle may be supported on separate devices, or on a single device. A single device for such testing may include two sets of support rollers which may or may not be independently glideably coupled to a base support.

In FIG. 12, the wheels of a tandem axle vehicle are supported on two independently glideably coupled platforms 513, 513a. Each wheel is supported on a pair of support rollers 520, 521, 520a, 521a which are rotatably coupled to platforms 513 and 513a, respectively. The platforms 513, 513a are independently coupled to the support 511 by glide bearings 530, 530a. In this embodiment, only the front platform 513 is provided with a front retention roller 543 and pairs of front and rear side retention rollers 556, 522. Although the rear platform 513a could likewise be provided with retention rollers, the retention rollers 543, 556, 522 coupled to the front platform 513 will prevent the vehicle from traveling off the device 510.

An alternate embodiment of the invention for testing tandem axle vehicles is shown FIG. 13. In this embodiment, the front tire is supported by a set of support rollers 620, 621 and the rear tire is supported by a single support roller 620a, which is parallel to the set of rollers 620, 621. In this way, the front set of support rollers 620, 621 will reach dynamic equilibrium with the supported front tire to prevent the vehicle from traveling off of the device 610. Consequently, the rear tire will be adequately supported by a single support roller 620a. The set of support rollers 620, 621 and the single support roller 620a are rotatably supported on a single platform 613. In the embodiment shown, only the front tire is provided with front and side retention rollers 643, 656, 622, although the rear wheel could likewise be provided with retention rollers.

It will be appreciated that the invention may be utilized in similar manners to test vehicles having dual-wheel tandem axles, or vehicles having three or more wheels on each end of an axle.

Thus, the invention provides a diagnostic testing device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A vehicle diagnostic device to support at least one tire comprising, in combination,
   a support having a horizontal upper surface,
   at least one platform,
   means for glideably coupling each platform to the upper surface of the support whereby the platform is permitted to glide horizontally in any direction,
   at least one pair of tire support rollers associated with each platform having substantially horizontal parallel axes, said support rollers being rotatably supported on the platform for rotation about said axes such that the support rollers provide rolling surfaces which contact the tread of a tire and allow the tire to cycle when supported on the support rollers,
   at least one pair of front retention rollers associated with a pair of support rollers, said front retention rollers disposed to restrict movement of the tire laterally relative to the support rollers, and
   at least one pair of rear retention rollers associated with a pair of support rollers, said rear retention rollers disposed to restrict movement of the tire laterally relative to the support rollers,
   whereby, as a tire is cycled, the platform adjusts relative to the tire and the support to assume a dynamic equilibrium.

2. A vehicle diagnostic device as claimed in claim 1 further comprising means for adjusting the distance between the front retention rollers.

3. A vehicle diagnostic device as claimed in claim 2 further comprising means for adjusting the distance between the rear retention rollers.

4. A diagnostic device as claimed in claim 3 further comprising at least one yoke disposed on one side of the tire in a substantially vertical plane, one front retention roller and one rear retention roller being coupled to said yoke.

5. A diagnostic device as claimed in claim 4 wherein the means for adjusting the distance between the front retention rollers and the means for adjusting the distance between the rear retention rollers adjusts the position of the yoke.

6. A diagnostic device as claimed in claim 5 wherein said means for adjusting comprise a threaded shaft rotatably coupled to said yoke whereby rotation of the threaded shaft adjusts the position of the yoke.

7. A diagnostic device as claimed in claim 6 further comprising an alignment shaft disposed parallel to the threaded shaft, said alignment shaft being slideably coupled to the yoke.

8. A diagnostic device as claimed in claim 4 comprising two yoke disposed on either side of the tire in substantially vertical planes, one front retention roller and one rear retention roller being disposed on each yoke, said means for adjusting the distance between the front retention rollers and said means for adjusting the distance between the rear retention rollers adjusting the positions of both yokes.

9. A diagnostic device as claimed in claim 8 wherein said means for adjusting comprise a threaded shaft rotatably coupled to said yokes, said threaded shaft having threads along one end that are the reverse of the threads along the opposite end whereby rotation of the threaded shaft adjusts the positions of the yokes an equal distance either toward or away from each other.

10. A diagnostic device as claimed in claim 1 wherein each said retention roller comprises an offset caster.

11. A diagnostic device as claimed in claim 4 wherein each said retention roller comprises an offset caster, at least one said front retention roller and at least one said rear retention roller being pivotally mounted to the yoke.

12. A diagnostic device as claimed in claim 1 further comprising at least one front center retention roller rotatably coupled to the platform 13. A diagnostic device as claimed in claim 1 wherein one of said support rollers comprises an axle shaft, said axle shaft having a bore extending therethrough perpendicular to the axis of the axle shaft, a locking pin which may be removably inserted in the bore so as to restrict movement of the support roller.

14. A diagnostic device as claimed in claim 1 wherein said support has a center opening and said platform has n extension extending downward from the lower surface of the platform into said center opening of the support, whereby the distance which the platform may horizontally glide relative to the support is limited when the extension contacts the support.

15. A diagnostic device as claimed in claim 1 further comprising bearings disposed between the platform and the support.

16. A diagnostic device as claimed in claim 1 further comprising a rotatable drive means coupled to said platform, said drive means being capable of cycling said tire.

17. A diagnostic device as claimed in claim 1 further comprising at least two centering lock pins, said lock pins capable of locking the platform and the support together.

18. A diagnostic device as claimed in claim 1 further comprising means for moving the support in substantially any horizontal direction when the weight of the vehicle is not exerted on the device, and means for restricting the movement of the support when the weight of a vehicle is placed on the device.

19. A diagnostic device as claimed in claim 18 wherein said means for moving comprises spring loaded casters, said casters extending to allow movement of the support when weight is not exerted on the device, and said casters retracting when weight is exerted on the device such that the support will not move.

20. A diagnostic device as claimed in claim 1 wherein the axes of the support rollers remain substantially perpendicular to the tire as it turns whereby the tire can be steered while cycling without traveling off the support rollers.

21. A diagnositc device as claimed in claim 1 comprising two platforms, and two pairs of tire support rollers.

22. A diagnostic device as claimed in 21 comprising two pairs of front retention rollers and two pairs of rear retention rollers.

23. A diagnostic device as claimed in claim 1 comprising two pairs of support rollers.

24. A vehicle diagnostic device to support at least one tire comprising, in combination,
    a support having a horizontal upper surface,
    at least one platform,
    means for glideably coupling each platform to the upper surface of the support whereby the platform is permitted to glide horizontally in any direction relative to the support,
    at least one pair of tire support rollers associated with each platform having substantially horizontal parallel axes, said support rollers being rotatably supported on the platform for rotation about said axes such that the support rollers provide rolling surfaces which contact the tread of a tire and allow the tire to cycle when supported on the support rollers,
    whereby, as a tire is cycled, the platform adjusts relative to the tire and the support to assume a dynamic equilibrium.

25. A diagnostic device as claimed in claim 24 further comprising a pair of front retention rollers disposed to restrict movement of the tire laterally relative to the support rollers.

26. A diagnostic device as claimed in claim 25 further comprising means for adjusting the distance between the front retention rollers.

27. A diagnostic device as claimed in claim 24 wherein the axes of the support rollers remain substantially perpendicular to the tire as it turns whereby the tire can be steered while cycling without traveling off the support rollers.

28. A diagnostic device as claimed in claim 24 further comprising a front center retention roller rotatably coupled to the platform.

29. A diagnostic device as claimed in claim 24 wherein one of said support rollers comprises an axle shaft, said axle shaft having a bore extending therethrough perpendicular to the axis of the axle shaft, a locking pin which may be removably inserted in the bore so as to restrict movement of the support roller.

30. A diagnostic device as claimed in claim 24 wherein said support has a center opening and said platform has an extension extending downward from the lower surface of the platform into said center opening of the support, whereby the distance which the platform may horizontally glide relative to the support is limited when the extension contacts the support.

31. A diagnostic device as claimed in claim 24 further comprising bearings disposed between the platform and the support.

32. A diagnostic device as claimed in claim 24 further comprising at least two centering lock pins, said lock pins capable of locking the platform and the support together.

33. A diagnostic device as claimed in claim 24 further comprising means for moving the support in substantially any horizontal direction when the weight of the vehicle is not exerted on the device, and means for restricting the movement of the support when the weight of a vehicle is placed on the device.

34. A diagnostic device as claimed in claim 33 wherein the means for moving the support comprises foot bearings attached to the lower side of the support, said foot bearings comprising,
    a bearing housing having an upper surface, vertical sidewalls, and a bearing in its lower surface wherein said bearing can freely rotate in any direction,
    a central cavity having a lower surface, the bearing housing being slideably disposed in the central cavity so that the bearing housing may slide vertically up or down,
    said upper surface of the housing being coupled by at least one spring to the lower side of the support whereby the housing extends below the lower surface of the central cavity when there is no weight placed on the platform, and the housing retracts upward into the central cavity when weight is placed on the platform.

35. A diagnostic device as claimed in claim 24 wherein the support rollers are made of a light color plastic.

36. A diagnostic device as claimed in claim 35 wherein the plastic is Deldrin.

37. A diagnostic device as claimed in claim 24 comprising two pairs of support rollers.

38. A diagnostic device as claimed in 37 comprising two pairs of front retention rollers and two pairs of rear retention rollers.

39. A diagnostic device as claimed in claim 24 comprising two platforms, and two pairs of tire support rollers.

* * * * *